H. FELDMEIER.
REGULATOR FOR CENTRIFUGAL SEPARATORS.
APPLICATION FILED NOV. 14, 1921.

1,429,331.

Patented Sept. 19, 1922.
2 SHEETS—SHEET 1.

INVENTOR.
Harvey Feldmeier,
by Parker & Rockwood,
his ATTORNEYS.

Patented Sept. 19, 1922.

1,429,331

UNITED STATES PATENT OFFICE.

HARVEY FELDMEIER, OF LITTLE FALLS, NEW YORK, ASSIGNOR TO D. H. BURRELL & CO., INC., OF LITTLE FALLS, NEW YORK.

REGULATOR FOR CENTRIFUGAL SEPARATORS.

Application filed November 14, 1921. Serial No. 514,897.

*To all whom it may concern:*

Be it known that I, HARVEY FELDMEIER, a citizen of the United States, residing at Little Falls, in the county of Herkimer and State of New York, have invented a new and useful Improvement in Regulators for Centrifugal Separators, of which the following is a specification.

This invention relates to centrifugal liquid separators of the kind used for separating cream from milk.

These separators as commonly constructed, comprise a separating bowl or element which rotates rapidly about a vertical axis and into which the whole milk is fed, the bowl being provided with separate discharge openings for the skim milk and cream. The density of the cream discharged is determined largely by the distance of the cream discharge opening from the axis of rotation of the bowl, and it is usual to form this hole eccentrically in a "cream screw" which is adapted to be turned to different positions to vary the distance of the cream discharge hole from the axis of rotation of the bowl and thus regulate, as desired, the density of the separated cream. But, the adjustment of the cream screw to effect this regulation can be accomplished only by first stopping the rotation of the bowl, because of the inaccessible location of the screw, and even then, accurate regulation of the density of the cream is difficult and usually has to be determined by trial.

It is often desirable to obtain cream of different densities or percentages of fat from the same or different runs of milk through a separator. For example, ordinary cream is about 18 to 20 per cent fat, while heavy cream is about 40 per cent fat. For churning, it is desirable to use cream of about 30 per cent fat, while for shipping to centralizers it is preferable to have cream of 50 per cent or even a larger percentage of fat in order to cut down the express charges. Some times it is necessary for dairymen to run off a quantity of standard cream and also a required amount of heavy cream, and the only way to do that with the cream separators as heretofore constructed is either to stop the separator and adjust the cream screw, or to set the machine for heavy cream and then standardize some of this cream by mixing a certain amount of skim milk with the heavy cream to bring down the percentage of fat. This latter procedure involves weighing or measuring, with consequent loss of time and liability of error, and the cream is oftentimes not of the same uniform density as when delivered from the separator at the required density. Some cities have a fixed standard for milk, having say 3.6 per cent fat and allow the surplus fat to be removed, so that it is a desideratum to be able to operate the separator so as to thus standardize the milk.

One object of this invention is to enable the operator to change, as required, the density of the cream or other separated liquid discharged from a centrifugal separator while the machine is running. Other objects of the invention are to provide means for diluting or altering one of the constituents discharged from the separator, said means being under the same regulated control as the fluid that is supplied or fed into the separating bowl or element, so that a predetermined and adjustable proportion may be maintained; also to provide a centrifugal separator with means of very simple and inexpensive construction, and which preferably can be applied at small cost to existing separators, whereby the density of the cream or separated liquid can be quickly and easily regulated as desired without stopping the machine; and also to improve centrifugal separators in the other respects hereinafter described and set forth in the claims.

In the accompanying drawings:

Fig. 3 is a fragmentary, sectional plan view thereof on an enlarged scale on line 3—3, Fig. 1.

10 represents the rotating saparating bowl or element of a centrifugal liquid or cream separator, the bowl being mounted on the upper end of an upright shaft 11 which is driven at the required speed by suitable mechanism, not shown. 12 represents a bowl case or cover surrounding the separating bowl, and 13 the supply or feed cup, supported on the bowl case, in which the milk is maintained at a substantially constant level by a float 14, and from which the milk is fed into the separating bowl. 15 and 16 represent respectively the skim milk and cream pans or receptacles into which the skim milk and cream are discharged from the separating bowl. 17 represents the skim milk discharge opening of the separating bowl and 18 the adjustable cream screw in which the discharge hole 19 for the cream is formed. The parts thus far described are usual in the ordinary centrifugal liquid or cream separator and may be of any usual or suitable construction.

Figure 1:
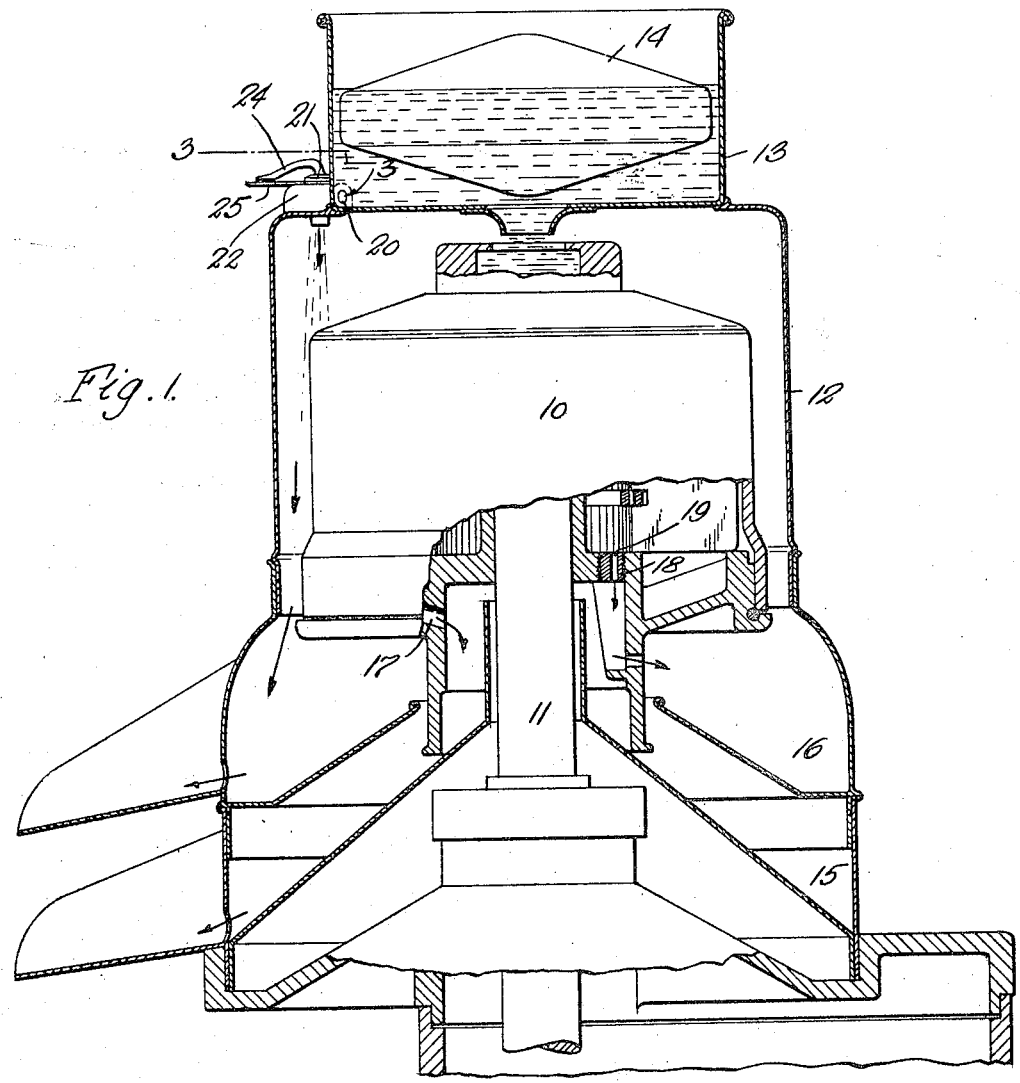
Fig. 1 is a fragmentary, sectional elevation of a centrifugal separator embodying the invention.
Figure 2:
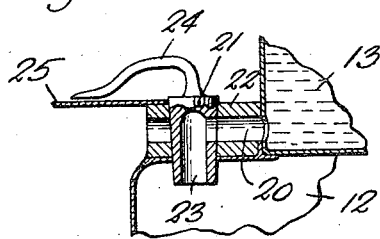
Fig. 2 is a fragmentary, sectional elevation thereof on an enlarged scale on line 2—2.
Figure 3:
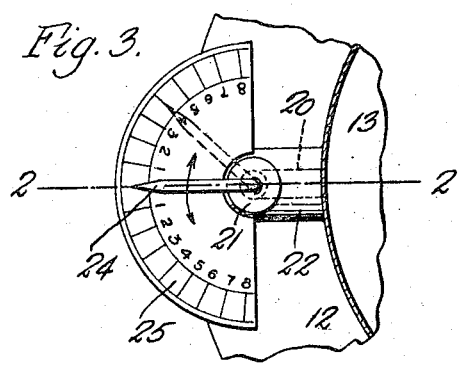
Fig. 3, showing the cream regulator.

Referring first to the embodiment of the invention as shown in Figs. 1–3 of the drawings, the cream regulator or device for regulating as required the density of the cream or other separated liquid delivered from the separator, comprises a by-pass passage 20 arranged to cause a portion of the milk from the feed cup or liquid supply device to pass by or outside of the separating bowl to the cream pan, or other point so as to mix with the cream discharging from the separating bowl, and a regulating valve or device which is adapted to be adjusted so as to regulate the quantity of milk discharging through the by-pass passage. In the construction shown in these figures, the by-pass passage 20 is formed in a pipe or fitting 22 which is secured on or arranged over the top of the bowl case 12 and connects with the feed cup 13, and a tapered plug valve 21, fitting in a tapered seat in the fitting 22, has a passage 23 therein connecting with the by-pass passage 20 and adapted to discharge the milk into the bowl case 12. Preferably, the by-pass is located so that the milk discharging therefrom will fall onto the outer surface of the separating bowl 10 and will be thrown off of the rotating bowl and caused to whirl in the bowl case for better mixing it with the separated cream or liquid. Means are preferably provided to enable the regulating valve or cock to be accurately adjusted to different, predetermined positions necessary to regulate accurately the flow of milk through the by-pass. For this purpose the valve is provided with a handle 24 which projects radially outwardly from the valve and has a pointed end which cooperates with a graduated scale on a dial or plate 25 located beneath the handle of the valve. The regulating valve 21 can be closed so as to prevent any of the milk from by-passing into the bowl case, in which event all of the milk will pass through the separating bowl, and the density of the cream will depend upon the adjustment of the cream screw 18.

Figure 4:
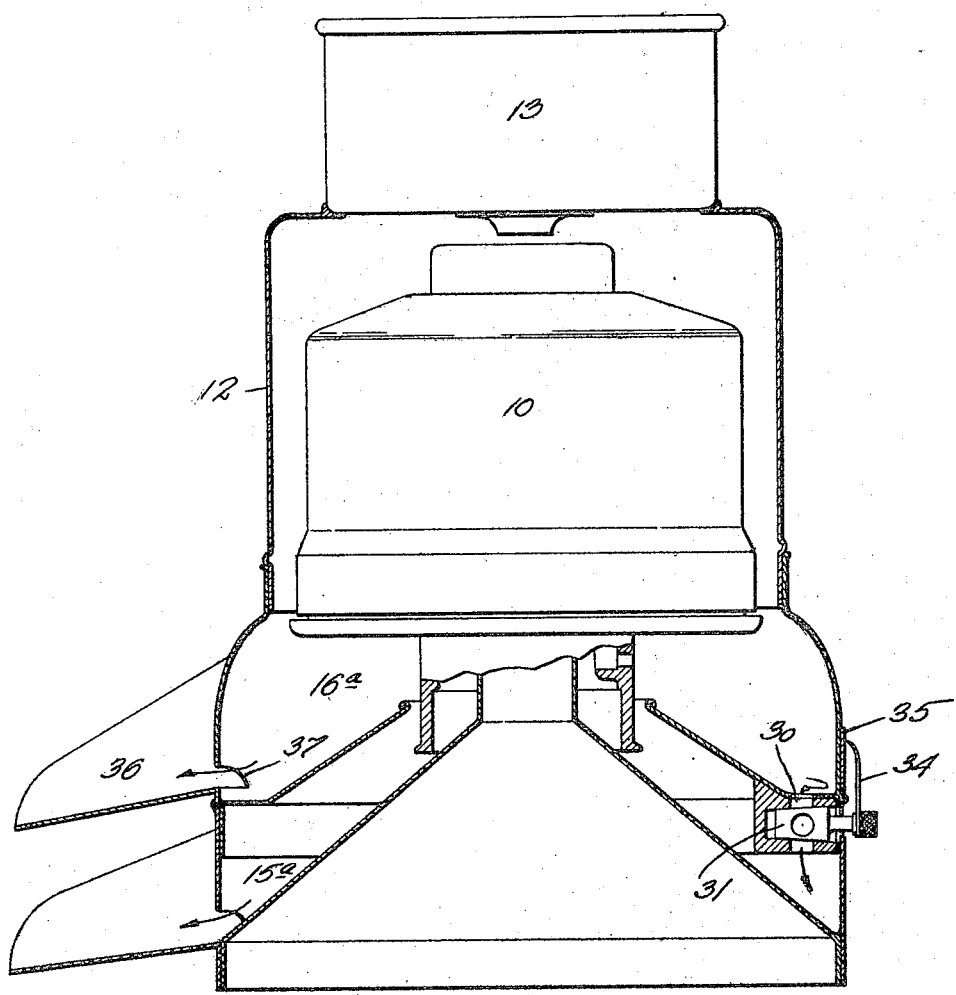
Fig. 4 is a fragmentary, sectional elevation of a slightly modified construction.

In the use of a centrifugal separator provided with the cream regulator as above described, the cream screw 18 can be set for heavy cream, say for instance, cream of 40 per cent fat. Then, if it is desired to obtain cream of a less density, say for example, 20 per cent cream, the regulating cock 21 is opened to the required position previously determined by test, and indicated by the co-operating scale. This allows enough of the full milk to run through the by-pass passage 20 into the bowl case and mix with the discharging cream, thereby reducing the cream to the desired 20 per cent. In a similar manner, cream of different, desired percentages of fat less than that for which the cream screw is set, can be readily obtained, simply by the appropriate adjustments of the regulating valve or cock to by-pass the required amount of milk. As the milk which is by-passed through the regulator is discharged into the bowl case onto the rotating separating bowl, it is caused to whirl rapidly around in the bowl case and cream pan 16, and is intimately mixed with the fog of cream that is coming out of the separating bowl. Thus, a thorough mixture of the cream with the milk is insured, so that the cream will be of uniform density throughout. By thinning or reducing the density of the cream in this manner, the work of the separator is lessened and time is saved because a portion of the milk does not have to pass through the separator and have the cream separated therefrom, and no time is lost as when diluting the cream by a separate procedure after it has been separated. Since the float 14 maintains a practically uniform liquid level and head in the feed cup 13, like adjustments of the regulator valve will give substantially like regulation at all times. But, a uniform head is not essential. So long as the head is the same on both the bowl feeding orifice and the by-pass passage, the same ratio if discharge from the two orifices is maintained Fig. 4 illustrates an arrangement of the regulator adapting it for delivering skim milk, as it comes from the bowl to the cream for diluting the cream; or for standardizing milk by deliverying cream coming from the bowl into the skim milk discharged by the bowl. In this construction a by-pass passage 30 leading from the bottom of the upper pan 16ª is arranged to discharge into the lower pan 15ª and is provided with a valve or plug 31 adapted to be adjusted for regulating the discharge, and having a handle or pointer 34 cooperating with a graduated dial 35 to show the adjustment. With this arrangement, cream can be by-passed from the cream pan 16ª into the skim milk in the pan 15ª for the purpose fo standardizing milk. For instance, if the milk contains 3.8 per cent fat, and it is desired to obtain standard milk of 3.6 per cent, then the milk can be run through the separator, part of the cream being allowed to by-pass through the regulator 30 into the skim milk, the valve 31 being set at a predetermined point so as to deliver enough cream back to the skim milk, to make the fat content of the same 3.6 per cent. The surplus cream is run off through the cream spout 36 into a separate receptacle. The by-pass should be large enough to allow the bulk of the cream to go back into the skim milk, and it is desirable to have the regular discharge opening 37 to the cream spout a little above the bottom of the pan so that a large percentage of the cream can be diverted through the by-pass.

In order to by-pass the skim milk into the cream for diluting the latter, the cream and skim milk discharges of the bowl can be easily reversed so that the bowl will deliver the skim milk into the upper pan 16$^a$ and the cream into the lower pan 15$^a$. The by-pass 30 and valve 31 can then be used to deliver skim milk in regulated quantities into the cream so as to give the desired dilution of the cream.

In the above specification, the invention is described as when used in separating milk for regulating the density of the cream or skim milk. The invention is not limited, however, to use in connection with the separation of cream from milk, but can also be used with centrifugal separators for other liquids. Furthermore, while the regulator is preferably constructed and arranged as first described to by-pass the liquid from the float-controlled feed cup into the bowl case because of the more uniform results and better mixing of the by-passed milk with cream in the bowl case incident to this construction, nevertheless the invention is not limited to this particular construction, as evidenced by the modified arrangement also disclosed.

I claim as my invention:

1. In a centrifugal liquid separator having a rotary separating element, a by-pass device arranged to deliver unseparated liquid from the liquid supply for the separating element into one of the separated liquids discharging from the separating element, for altering the said separated liquid.

2. In a centrifugal liquid separator having a rotary separating bowl, and a supply device for feeding liquid to the separating bowl, a by-pass device arranged to deliver unseparated liquid from said supply device into one of the separated liquids discharging from the separating bowl for altering said separated liquid.

3. In a centrifugal liquid-separator having a rotary separating bowl, a supply device for feeding liquid to the separating bowl, and separate discharge means for the liquids separated by the separating bowl, a by-pass device arranged to deliver unseparated liquid from said supply device to the discharge means for one of the liquids separated by the separating bowl, for altering said separated liquid.

4. In a centrifugal liquid separator, the combination with a rotary separating bowl, a case surrounding the bowl and into which one of the separated liquids is discharged by the bowl, and a supply device for feeding liquid to the separating bowl, of a by-pass device arranged to deliver unseparated liquid from said supply device into said case to mix with the separated liquid discharged therein by the separating bowl.

5. In a centrifugal liquid separator having a rotary separating bowl, and a supply device for feeding liquid to the separating bowl, a by-pass device arranged to deliver unseparated liquid from said supply device into one of the separated liquids discharging from the separating bowl, said by-pass device being adjustable for regulating the quantity of liquid by-passed and the density of said separated liquid.

6. In a centrifugal liquid separator, the combination with a rotary separating bowl, a case surrounding the bowl and into which one of the separated liquids is discharged by the bowl, and a supply device for feeding liquid to the separating bowl, of a by-pass device arranged to deliver unseparated liquid from said supply device onto the outside of the rotary separating bowl to mix with the separated liquid discharged by the bowl into said case.

7. In a centrifugal liquid separator, the combination with a rotary separating element, a liquid feed cup therefor, and means for maintaining a substantially constant level in the feed cup, of a by-pass device arranged to deliver unseparated liquid from said feed cup past the separating element into one of the separated liquids discharging from the separating element.

8. In a centrifugal liquid separator, the combination with a rotary separating element, a liquid feed cup therefor, and means for maintaining a substantially constant level of the liquid in the feed cup, of a by-pass device arranged to deliver unseparated liquid from said feed cup past the separating element into one of the separated liquids discharging from the separating element, said by-pass device including regulating means for definitely controlling the quantity of liquid delivered by said by-pass device.

9. In a centrifugal liquid separator, the combination with a rotary separating bowl, a case surrounding the bowl, a liquid feed cup on said case, and a receiving pan for one of the separated liquids discharged by the bowl, said pan communicating with said case, of a by-pass passage arranged to deliver unseparated liquid from said feed cup into said case to mix with the separated liquid in said pan, and an adjustable valve controlling the flow of liquid through said by-pass passage.

10. In a centrifugal separator, the combination with a liquid feed device for the separator, and a rotary separating element for separating the liquids from said feed device into constituent liquids, of a by-pass device arranged to deliver into one of said constituent liquids that is discharged from the separating element, a regulated quantity of one of said other liquids for altering the density of said constituent liquid.

11. In a centrifugal liquid separator having a rotary separating element, means for delivering liquid to one of the constituent liquids that is discharged from the separating element for altering the density of said constituent liquid, said means being under the same regulated control as the liquid that is supplied to the separating element so that a predetermined proportional density of said constituent liquid may be maintained.

12. In a centrifugal liquid separator having a rotary separating element for separating liquids fed thereto into constituent liquids, a by-pass device arranged to deliver into one of said constituent liquids that is discharged from the separating element, a quantity of one of said other liquids for altering the density of said constituent liquid, said by-pass device being adjustable while said separating element is in operation for regulating the density of said constituent liquid.

13. In a centrifugal separator, the combination with a rotary separating bowl for separating cream from milk, and a feed regulator for controlling the supply of new milk to the bowl, of a by-pass device constructed and arranged to deliver a regulated quantity of milk into the cream that is discharged from the bowl, the milk delivered by said by-pass device being under the control of said feed regulator.

HARVEY FELDMEIER.

Witnesses:
J. E. MERCHANT,
E. M. WICKS.